United States Patent [19]

Rafferty et al.

[11] E Re. 28,742

[45] Reissued Mar. 23, 1976

[54] PUMPS CAPABLE OF USE AS HEART PUMPS

[76] Inventors: Edson Howard Rafferty, 419 Ontario St., S. E.; Harold D. Kletschka, 1925 Noble Drive, both of Minneapolis, Minn. 55414

[22] Filed: Jan. 3, 1972

[21] Appl. No.: 215,221

Related U.S. Patent Documents

Reissue of:

[64] Patent No.: 3,487,784
Issued: Jan. 6, 1970
Appl. No.: 678,265
Filed: Oct. 26, 1967

[52] U.S. Cl. ..... 415/90; 415/213 R; 415/DIG. 4; 128/1 D; 128/DIG. 3

[51] Int. Cl.[2] ..... F04D 1/14; F01D 1/14

[58] Field of Search ..... 415/90, 76, 213; 416/178, 416/180; 128/DIG. 3, 1 D

[56] References Cited

UNITED STATES PATENTS

| | | | |
|---|---|---|---|
| 413,684 | 10/1889 | Sargent | 415/170 A |
| 644,475 | 2/1900 | Sharpneck | 103/101 |
| 702,674 | 6/1902 | Phillip | 415/87 |
| 735,339 | 8/1903 | Brooks | 103/101 |
| 1,061,142 | 5/1913 | Tesla | 415/90 |
| 1,061,206 | 5/1913 | Tesla | 415/90 |
| 1,149,523 | 8/1915 | Jerman, Jr. | 415/172 |
| 1,182,439 | 5/1916 | Wood | 416/186 |
| 1,639,279 | 8/1927 | Winkle | 308/36.1 |
| 1,667,992 | 5/1928 | Sherwood et al. | 103/108 |
| 1,715,944 | 6/1929 | Oliver | 415/170 A |
| 1,786,435 | 12/1930 | Komfala | 415/188 |
| 1,849,127 | 3/1932 | Wood | 103/115 |
| 1,991,529 | 2/1935 | Veach | 415/122 |
| 2,087,834 | 7/1937 | Brown et al. | 415/90 |
| 2,515,538 | 7/1950 | Wall | 86/1 |
| 2,655,868 | 10/1953 | Lindau et al. | 415/71 |
| 2,759,428 | 8/1956 | Kirby | 415/197 |
| 2,876,769 | 3/1959 | Cordova | 23/258.8 |
| 2,990,107 | 6/1961 | Edwards | 230/127 |
| 3,139,832 | 7/1964 | Saunders | 128/DIG. 3 |
| 3,228,344 | 1/1966 | Cooper | 103/115 |
| 3,261,294 | 7/1966 | Schofield et al. | 103/5 |

FOREIGN PATENTS OR APPLICATIONS

| | | | |
|---|---|---|---|
| 247,106 | 2/1926 | United Kingdom | |
| 539,373 | 9/1941 | United Kingdom | |
| 577,051 | 5/1924 | France | |
| 980,672 | 12/1950 | France | |
| 331,142 | 6/1930 | United Kingdom | 415/90 |
| 599,519 | 10/1932 | Germany | 415/90 |
| 361,209 | 10/1938 | Italy | 415/90 |
| 866,706 | 5/1941 | France | |
| 159,785 | 3/1921 | United Kingdom | |
| 538,658 | 8/1941 | United Kingdom | |
| 814,564 | 6/1959 | United Kingdom | |
| 472,199 | 3/1952 | Italy | |
| 268,028 | 7/1950 | Switzerland | |

*Primary Examiner*—Henry F. Raduazo
*Attorney, Agent, or Firm*—Merchant, Gould, Smith, Edell, Welter & Schmidt

[57] ABSTRACT

The disclosure is of pumps which are capable of use as heart pumps, that is, for pumping blood in connection with the maintenance of the life function in a human or animal body to replace one or more pumping functions of the heart.

6 Claims, 13 Drawing Figures

Edson Howard Rafferty
Harold D. Kletschka
INVENTORS

BY Carl B. Fox, Jr.
ATTORNEY

Edson Howard Rafferty
Harold D. Kletschka
INVENTORS

BY Carl B. Fox, Jr.

ATTORNEY

Edson Howard Rafferty
Harold D. Kletschka
INVENTORS

BY Carl B. Fox, Jr.
ATTORNEY

PUMPS CAPABLE OF USE AS HEART PUMPS

Matter enclosed in heavy brackets [ ] appears in the original patent but forms no part of this reissue specification; matter printed in italics indicates the additions made by reissue.

BACKGROUND OF THE INVENTION

Field of the invention

The field of the invention is the field relating to apparatus for pumping blood of a living person, or of a living animal, to replace one or more pumping functions of the human or animal heart in case of disability thereof. The heart replacement may be partial or complete. While the pumps provided according to the invention are provided principally for pumping blood, it will be apparent that the pumps may be employed in other instances for pumping other materials. The pumping equipment provided by the invention has rotating fluid accelerators or rotators. The pumps are adapted for pumping of blood and other delicate fluid materials without any pronounced physical effect on the blood or other fluid being pumped. The pumps do not impose sudden pressure changes, impacts, rapid changes in direction of flow, in order to prevent injury to or destruction of the pumped material and its components.

Description of the prior art

In the prior art, artificial heart pumps heretofore employed have been of the positive displacement type. Because of the relatively delicate nature and structure of blood, it has been found that use of centrifugal pumps invariably results in physical disruption of the blood and at least some of its components. Although it has been shown that a pulsating movement of blood through the body is not necessary to sustain life, the prior art has not afforded a solution to the problems involved in utilization of centrifugal pumps for pumping blood, since at least partial destruction of the blood has always resulted when centrifugal pumps were used. This invention solves these problems, by providing rotative pumping means for pumping blood, without any significant destruction of the blood and its components resulting from the pumping.

SUMMARY OF THE INVENTION

The invention is of rotative pumps which are suitable for use in primary blood for circulation through the body passages, veins, arteries, etc., of a living person or animal. The pumps are adaptable for use disposed within a body cavity, as replacements for either or both of the pumping functions of the heart. The pumps herein provided may also be used for pumping blood externally of the body. The pumps are adapted to pump without producing severe pressure changes, physical impacts, and the like, so that none of the blood components is subjected to treatment which will destroy it for use. The pumps do not require the use of valves, such as those of the heart, but valves may be provided if desired.

BRIEF DESCRIPTION OF THE DRAWINGS

FIG. 9, in addition, shows a built-in drive motor for the accelerator or rotator.

DESCRIPTION OF THE PREFERRED EMBODIMENTS

Figure 1:
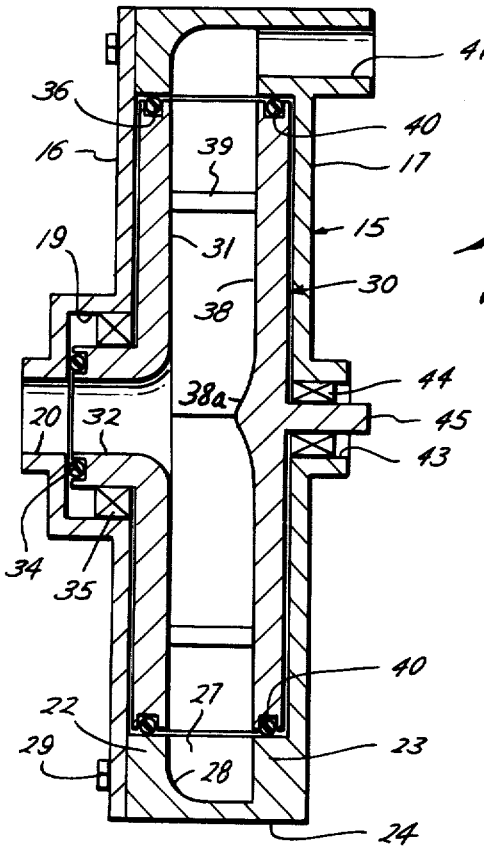
FIG. 1 is a cross sectional view of one preferred form of pump according to the invention.

Blood is a complex and delicate fluid. It is essentially made up of plasma, a pale yellow liquid containing microscopic materials including the red corpuscles (erythrocytes), white corpuscles (leukocytes), and platelets (thrombocytes). These and the other constituents of blood, as well as the nature of suspension of these materials in blood, are fairly readily affected by the manner in which blood is physically handled or treated. Blood subjected to mechanical shear, to impact, to depressurization, or the like, may be seriously damaged. The balance between the blood constituents may be affected. Commencement of deterioration may result from physical mishandling of blood. Blood which has been damaged may be unfit for use.

The heart pumps blood through the body in a circulating, cyclic, fashion. The blood passes repeatedly through the heart. A pump for replacing one or more pumping functions of the heart should therefore be capable of repeatedly pumping the same blood, time and time again, without damaging the blood, at least not more than to the extent where the body can function to repair or replace the blood components and eliminate damaged and waste materials therefrom.

Blood also contains dissolved and chemically combined gases, which may be seriously affected by improper physical handling of the blood. It has, for example, been established that subjecting blood to negative or subatmospheric pressures of, say, minus 300 millimeters of mercury, is detrimental, even when the reduced pressures are only temporary.

The blood pressure is the pressure of the blood on the walls of the arteries, and is dependent on the energy of the heart action, the elasticity of the walls of the arteries, the peripheral resistance in the capillaries, and the volume and viscosity of the blood. The maximum pressure occurs at the time of the systole of the left ventricle of the heart and is termed maximum or systolic pressure. The normal systolic pressure may be from about 80 millimeters of mercury (mm. Hg) to about 150 mm. Hg. the pressure ordinarily increasing with increasing age. Pressures somewhat outside this range are not uncommon. The minimum pressure is felt at the diastole of the ventricle and is termed minimum or diastrolic pressure. The diastolic pressure is usually about 30 to 50 mm. Hg lower than the systolic pressure.

The preferred embodiments of the invention shown and described have in common that the blood or other delicate fluid is handled gently, without shear, shock, vibration, impact, severe pressure or temperature change, or any other condition or treatment which would unduly damage the blood or other fluid. Essentially non-turbulent flow is maintained through the pumps, and the pumped fluid is accelerated gradually and smoothly.

The pumping action obtained may be described as radially increasing pressure gradient pumping, or in some cases more specifically as forced vortex radially increasing pressure gradient pumping. In centrifugal pumps, the fluid acted on by the vanes of the impeller is positively driven or thrown outwardly (radially) by the vane rotation. The fluid as it moves from the vanes to the ring-shaped volute space beyond the tips of the vanes is reduced in velocity, and as the velocity decreases the pressure increases according to Bernoulli's theorum. On the other hand, in the pumps provided according to this invention, the pumped fluid is not driven or thrust outwardly but instead is accelerated to circulate in the pumping chamber at increasing speeds as it moves farther and farther from the center. As the outer periphery of the accelerator or rotator, the speed of the fluid is maximum.

The action of the fluid in the pumps may be clarified by analogy to a glass of water turning about its vertical axis without sideways motion or wobble. Because of its contact with the sides and the inherent potential shear force of the water in the glass, the water will rotate, in the form of a forced vortex, without much clip or shear between radially adjacent particles of water, and the water radialy away from the center of rotation will be moving faster than water nearer the center. If water is introduced through a tube at the axis of the glass and water is removed through one or more holes through the side of the glass, water will be pumped by the rotation of the glass. In the pumps afforded by this invention, while rotators are provided, in a number of different forms, the rotators are designed such that they act to increase the swirling speed of the liquid passing through the pump, but do not act to drive or throw the liquid toward the periphery or volute of the pump chamber, but instead only increase the rotational speed of the liquid. As the rotative speed of the liquid is increased, it achieves a higher "orbit" about the center of the accelerator and moves toward the periphery of the chamber.

Referring first to the apparatus shown in FIG. 1 of the drawings, a housing 15 has parallel spaced circular walls 16, 17. At the center of wall 16, an offset chamber 19 is formed which terminates outwardly in an inlet passage 20. Wall 17 has at its periphery circular formations 22, 23 joined by peripheral wall 24 between which is formed a peripheral ring-shaped chamber 27. Formation 22 is internally shaped to provide a flow-direction flaring surface 28. Wall 16 is connected to formation 22 by a plurality of circularly spaced screws 29.

A rotative circular vane 31, forming one side of the accelerator or rotator 30, has at one side a flared inlet formation 32 which extends into chamber 19 and is sealed to the wall of chamber 19 by O-ring 34 and which rotates in bearing 35 disposed within chamber 19. The interior wall of inlet 32 is flush with the wall inlet 20. An O-ring 36 around the periphery of flat vane or disc 31 seals with the inner side of formation 22. The inner side of vane 31 is flush with the beginning of curved surface 28 so that fluid flowing through the pump introduced through entrance 20 flows smoothly from entrance 20 to entrance passage 32, through the pump chamber, and smoothly past the intersection of the periphery of vane 31 and surface 28.

Vane 31 is connected to a second rotating vane 38, forming the other side of accelerator or rotator 30, which is concentric and parallel to vane 31, by circularly spaced pins or rods 39. Vane 38 has O-ring 40 about its periphery to seal with the inner side of formation 23. An outlet passage 41 is provided at one side of wall member 17, it being possible to provide any number of such outlets circularly spaced about the pump as is desired. Wall 17 has at its center a central passage 43 containing bearing 44 which is in contact with rotating shaft 45 connected to, or forms a part of, vane 38. Vane 38 has at the center of its inner side the rounded projection 38a, which guides incoming fluid to flow smoothly along the vanes.

The pump shown in FIG. 1 operates in the following manner: The fluid to be pumped flows inwardly through passage 20 into passage 32 to the space between rotating accelerator vanes 31, 38. Shaft 45 is driven rotatively by means not shown, and vanes 31, 38 rotate together (in either direction) because of their connection at pins or rods 39. The pump operates on a forced vortex principal, there being no impeller surfaces in the pump for impelling blood or other fluid material being pumped radially outwardly toward the periphery of the pump chamber. A forced vortex pump operates on the principal that a rotating chamber causes rotation of its contents, with creation of a vortex, so that a body of circulating fluid is maintained within the pump chamber by rotation of the vanes 31, 38 at opposite sides of the chamber, whereby the rotational speed of liquid in the pump is increased from the center to the periphery of the chamber of the pump. The liquid is withdrawn through the outlet 41, and as has been stated before, a plurality of outlets 41 may be provided if desired.

It will be seen that the blood or other fluid passing through the pump is not submitted to any substantial agitation by the rotation of the vanes, or by any other portion of the pump apparatus. There are no sudden changes in direction of the flow through the pump, all joints between surfaces being smooth and all surfaces over which the fluid flows being smooth.

Figure 2:
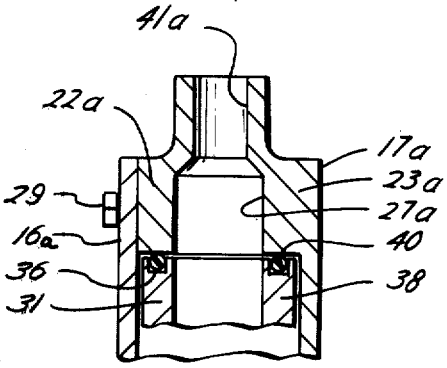
FIG. 2 is a partial cross sectional view showing a modification of the pump of FIG. 1.

Referring now to FIG. 2 of the drawings, there is shown a portion of a pump identical to that shown in FIG. 1 except that the flow outlet is of modified form. The outlet 41a from the pump chamber is shown to be disposed radially from the pump chamber instead of parallel to the pump axis as in FIG. 1. The wall elements 16a, 17a are like those shown in FIG. 1 except that the curved surface 28 is omitted at the interior of formation 22a and the peripheral chamber 27a is of rectangular cross section. The vanes 31, 38 are as shown in FIG. 1, as is also the remainder of the pump, only the peripheral portions of the pump elements being modified as shown. The operation of the pump in FIG. 2 is the same as that of the pump of FIG. 1, except that the pumped fluid exists from the pump radially instead of in line with the pump inlet. Plural outlets 41a may be provided if desired.

Figure 3:
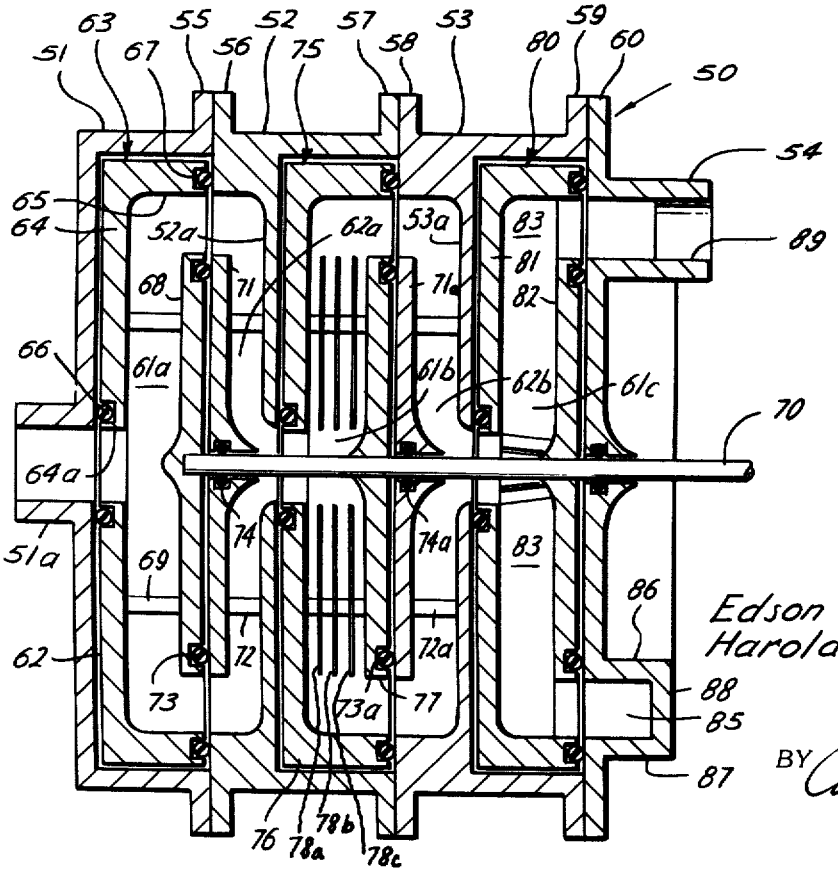
FIG. 3 is a cross sectional view of a three-stage pump, according to the invention.

Referring now to FIG. 3 of the drawings, there is shown a pump 50 having three serially disposed pumping stages, whereby the pressure of blood (or other fluid) pumped may be higher than the pressure obtained in a single stage of pumping, such as by the pumps shown in FIGS. 1 and 2. The pump housing is made up of housing elements 51, 52, 53 and 54. The housing elements are joined at peripheral bolt flanges 55–56, 57–58, 59–60, the bolts not being shown.

The pump of FIG. 3 has three pumping chambers 61a, 61b, 61c, and two return chambers 62a, 62b through which the fluid pumped by the first two pumping stages is returned to the center of the pump for the next pumping stage.

The rotator or accelerator 63 in pumping chamber 61a includes a flat circuit vane 64, having peripheral flange 65, and sealed to the housing for rotation therein by O-ring seals 66, 67, and a flat circular vane 68 spaced from vane 64 and supported by plural circularly spaced pins or rods 69, and mounted at its center on shaft 70.

The return chamber 62a is formed between circular plate 71 and housing wall 52a, plate 71 being supported by wall 52a through plural circularly spaced pins 72, and sealed to the periphery of vane 68 by O-ring 73. Vane 68 and plate 71 are of the same diameter. Shaft 70 is disposed for rotation through plate 71 at O-ring seal 74.

The rotator or accelerator 75 in pumping chamber 61b includes vanes 76, 77 which are identical with vanes 64, 68, respectively, except that shaft 70 extends completely through vane 77 as shown. The seals 66, 67 and rods 69 are provided as before. Rotator 75 differs from rotator 63, however, in that a plurality of relatively thin flat plates or sheets 78a–78c are spaced parallelly between the facing sides of vanes 76, 77 within the pumping chamber. Plates 78a–78c are circular and may be of the same or different diameters. They are supported at perforations therethrough by the pins 69 extending between vanes 76, 77. Any number of these plates may be provided, so long as the spacings therebetwen do not become small. The spacings between the adjacent vanes and plates should not be less than about ¼ inch. If the vanes and plates are spaced more closely, the shear stresses imposed on the blood or other fluid become excessive, with resulting trauma of blood and harmful physical effects in the case of other fluids. In Transactions of the ASME, July 1963, page 205, it is stated in the second complete paragraph of column 2, that in pumps therein termed "shear-force pumps," that "Due to the necessity for very close spacing of the shear surfaces, the pump" (ed) "fluid must be essentially free of suspensions." It should be made clear at this point that the utilization of very close spacings is not contemplated by this invention, so that the invention is distinguished over the apparatus described in the aforementioned article, and also is distinguished over apparatus of the type or kind proposed in Patent No. 1,061,206 to Tesla. In such apparatus, the emphasis is on very high rotational velocities and very close spacings, which make them unfit for use insofar as the contemplation of this invention is concerned. According to this invention, the emphasis is on gentle, non-turbulent handling of the pumped fluid, as is illustrated by the aforementioned rotating glass of water with nothing to rotationally accelerate the water but the smooth side of the glass. Yet, the water after a time rotates with the glass and continues the rotation as long as the glass continues to rotate.

Return chamber 62b is identical with return chamber 62a, and includes elements 71a, 53a, 72a, 73a, 74a, respectively identical with elements, 71, 52a, 72, 73, 74 heretofore described.

The rotator or accelerator 80 is made up of vanes 81, 82 which are respectively identical in form with vanes 64, 76 and 68, 77. The rods 69 are omitted, and the vanes 81, 82 are connected by plural vanes 83, radially disposed and arcuately spaced. The vanes 83 may be flat as shown, or may be curved end-to-end and twisted like the vanes shown in FIG. 9. Any suitable number of vanes 83 may be provided. Each vane 83 extends from near the axis of the pumping chamber to terminate the line with the inner face of vane 82, as shown.

Within housing element 54, there is a ring-shaped chamber 85 disposed between circular walls 86, 87, 88, walls 87, 88 being aligned with the sides of the annular opening between vanes 81, 82. Outflow opening 89 is provided through wall 88, and plural such openings may be provided if desired.

Shaft 70 is rotated by means not shown to rotate the vanes of the three rotators.

The flow inlet to the pump is provided through nipple 51a and circular opening 64a aligned flushly therewith.

It will be realized that pumps may be supplied according to the invention with any number of pumping stages, and may include individual pumping stages of any of the types mentioned herein in any combination.

Figure 4:
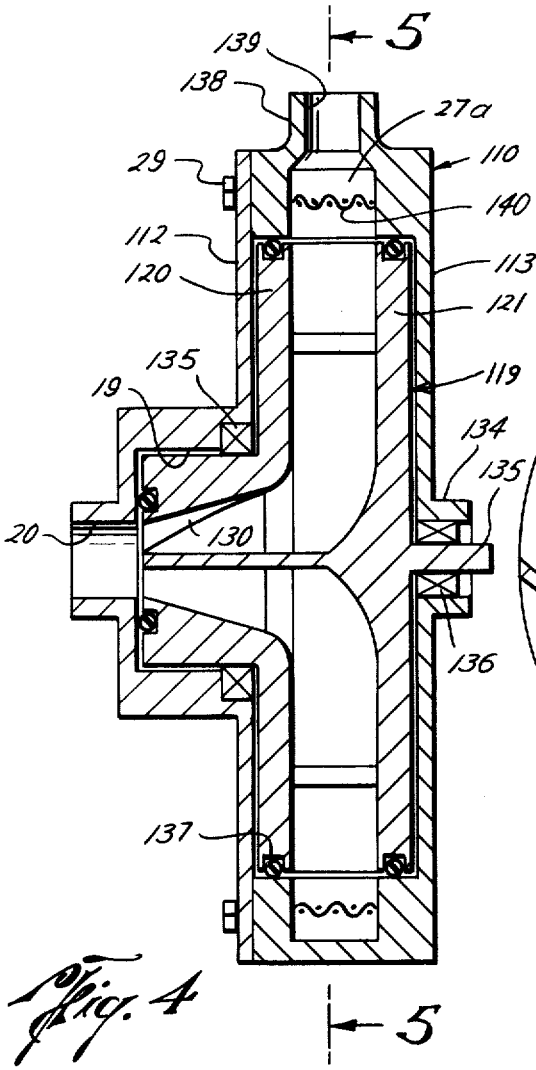
FIG. 4 is a cross sectional view of a modified form of pump according to the invention.
Figure 5:
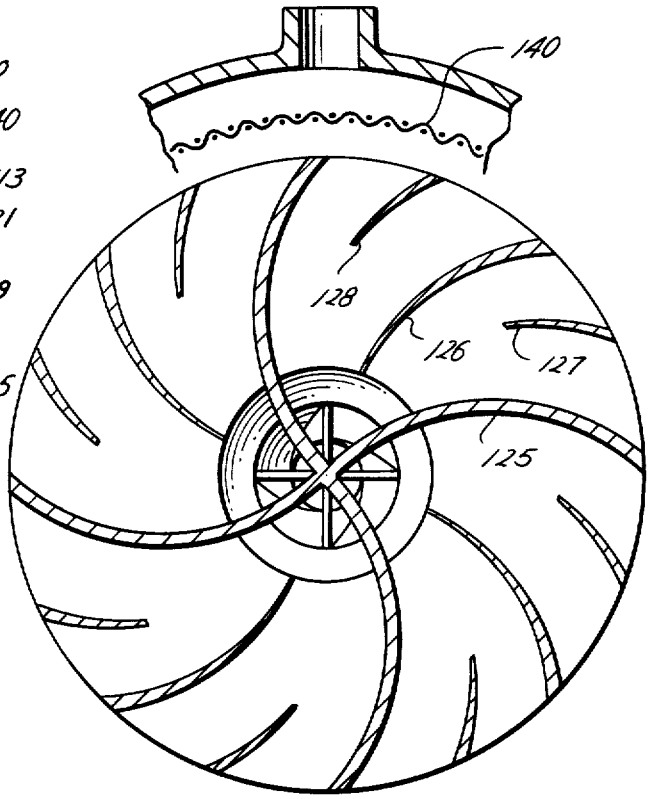
FIG. 5 is a partial cross sectional view taken at line 5—5 of FIG. 4.
Figure 6:
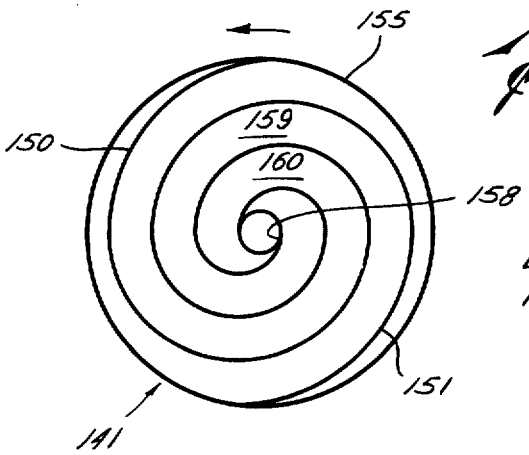
FIGS. 6–8, 8A, and 9–12 show different forms of fluid accelerators or rotators which may be employed in pumps according to the invention.

Referring now to FIGS. 4 and 5 of the drawings, there is shown a pump 110 having a housing made up of members 112, 113 identical with the corresponding housing members of FIG. 2 except that bearings 135 is in a different disposition than bearing 35 (see FIG. 1). Elements of FIGS. 1–2 which are the same as indicated by the same reference numerals in FIGS. 4–5. The accelerator 119 includes a flat circular vane 120 and a second flat circular vane 121. The vanes 120, 121 are connected by the full-radius curved vanes 125, and the shorter curved vanes 126, 127, and 128. As best shown in FIG. 5 of the drawings, the vanes 125 extend from the center of the accelerator to its periphery, the vanes 126 extend from a point spaced from the center of the accelerator to its periphery, and the vanes 127, 128 extend from about the centers of vanes 126 to the periphery of the accelerator. Four of each type of vanes are shown in the drawing.

The objective of this configuration of the vanes is that the impetus of the vanes in thrusting the pumped fluid outwardly is minimal, only four of the sixteen vanes acting on the blood, or other fluid, as it emerges from the entrance into the pump chamber, and, as the blood progresses through the blood chamber, from its center toward the periphery, additional vanes take action to move the blood in its spiral motion, with increasing velocity, toward the periphery of the pumping chamber.

The rotator 119 has a flared entrance 130 which merges smoothly into the face of vane web 120. The interior of entrance 130 blends smoothly with the interior of entrance 20 which is formed in the offset space 19 at a side of the housing.

At the opposite side of the housing, wall 113 has at one side a cylindrical formation 134 through which rotative shaft 135 is disposed within bearing 136, and O-ring seal 137 is disposed about the outer periphery of vane 121 to seal between the vane and housing.

The housing has at one side the radially disposed outlet 138 having outflow passage 139 therethrough. Any number of similar outlets may be provided.

A ring shaped screen 140 is disposed around the ring shaped space 27a of the apparatus of FIGS. 4–5, the screen dividing the space into inner and outer annular portions. The screen may be omitted. Any porous or perforate divider may be substituted for the screen, e.g. a plate having one or more openings, spaced bars, etc. The screen serves to create two distinct annular flow nes within space 27a, an inner zone in which the fluid ɔves circularly as accelerated by the rotator, and an ıter zone reached by the fluid by outflow through the reen, over its complete circular length, the fluid flow rough the screen reducing its circular velocity. Thus, e outer zone is a zone of slower velocity from which e fluid moves in the outlet 139, whereby eddy curnts and turbulence at the outlet is reduced.

Figure 7:
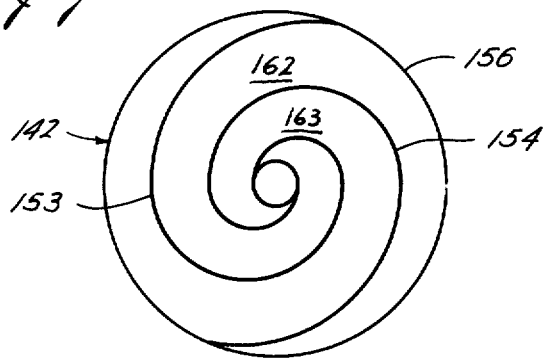

Referring now to FIGS. 6–12, there are shown a ımber of forms of rotators or accelerators which may used in the pumps, these being shown more or less hematically. The rotators 141, 142 shown in FIGS. 6 d 7 are similar, each having a pair of curved blades or nes 150–151 and 153–154, respectively. The views own are cross sections taken at right angles to the is of rotation of each rotator, and the rotator shown FIG. 6 has a flat side plate or vane 155 which is rcular, and similarly the accelerator shown in FIG. 7 ıs a side vane or plate 156, also circular. In most cases ere will be another plate 155 or 156 at the other, or ar, side of the vanes. The rotators, therefore, are ıclosed at their sides by these plates. The rotator of G. 6 has central openings 158 where the liquid to be ımped enters, and a pair of flow passageways between e vanes indicated by reference numerals 159, 160 hich are of constant cross section from the center to e periphery of the rotator. Fluid passing through this tator does not have opportunity for volume expanɔn, as the flow passages, through which it moves are constant size from their beginning to their end. The ıtator of FIG. 7, on the other hand, has the pair of ɔw passages 162, 163 extending from the center to e outside of the rotator which increase in cross secɔn from their central entrance to their peripheral ıtlet ends.

Figure 8:
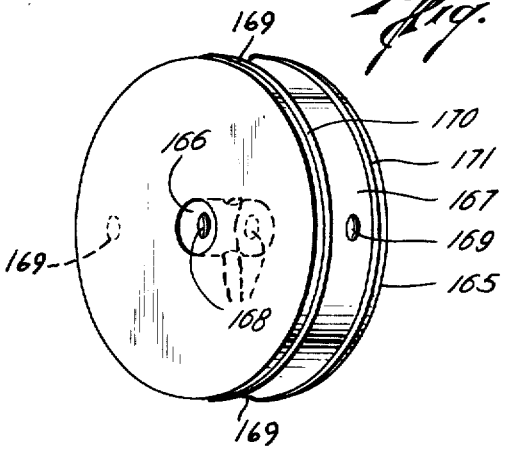

The rotator shown in FIG. 8 consists of a hollow, um-like, body 165, having a cylindrical tube 166 etween central openings at each of its sides, and havg a curved peripheral wall 167. The tube 166 and wall 57 have plural openings 168, 169, respectively, any ıitable numbers and spacings of these being provided, ur of each being shown circularly equally spaced. uid enters through tube 166 and flows into the drum rough openings 168. The drum is rotated and the ıid therein is caused to rotate, the rotator giving the ıid circular motion but no outward radial motion. entrifugal force resulting from circular motion of the ıid, however, causes the motion of the fluid to be ıiral instead of circular, so that the fluid after moving ırally through the space within the drum flows outardly through the openings 169 into the pumping ıamber space annularly around the rotator, from hich the fluid exits through one or more outflow pasıges of any suitable form. A pair of O-ring seals 170, 71 disposed in suitable grooves around the opposite lges of the body 165 seal between the rotator and the ımp housing in the manner shown in other drawing gures.

Figure 8A:
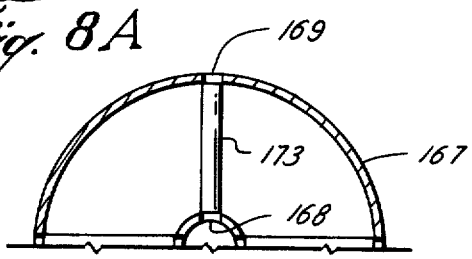

In FIG. 8A, a rotator is shown which is a modification that shown in FIG. 8, and to which the description of IG. 8 applies to the elements indicated by the referıce numerals of FIG. 8, the modification residing in ıe addition of the tubes 173, each of which extends etween one of the inner holes 168 and one of the ıter holes 169 at the same side of the rotator. The ıbes 173 may be straight and radial as shown in the rawing, or may be curved or angular, by proper posiɔns of the holes 168, 169 and shaping of the tubes. In this rotator, the fluid would pass from tube 166 through tubes 173 to exit at the periphery, upon rotation of the rotator.

Figure 9:
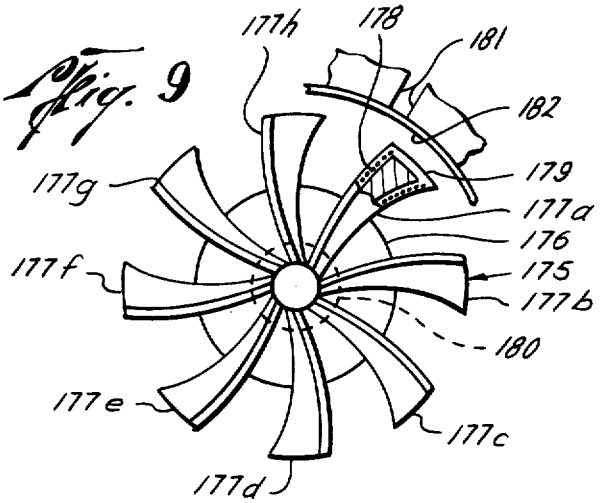

Referring now to FIG. 9 of the drawings, a rotator 175 is shown which has a plate or disc 176 at each of its sides which may be identical or of different form or size, only one being shown in the drawing, and between which there are provided the equally circularly spaced curved blades 177a–177h, each curved from its inner end to its outer end as shown and each having a twist throughout its length similar to the twist of a propeller. The blades or vanes, may extend beyond the outer edges of the discs 176. Each blade 177a–177h carries a winding 178, which is covered by an impervious layer or membrane 179. The blade windings are connected to contact elements of a commutator 180. The surrounding pump housing is provided with the circularly spaced magnets or coils 181, which are separated from the pumping chamber by an impervious layer or membrane 182. The commutator rotates with the rotator in the usual manner of an electric motor. The rotator windings and housing magnets or coils constitute an internal electric motor for driving the rotator to pump fluid. The electric motor thus provided may be of any of the known types, AC or DC, with or without commutation powered by electrical conductors leading thereto from any suitable AC power source or from a battery, located either internally or externally of the body. The conductors may be disposed through the outer body wall from the exterior of the body, installed surgically. The power source may include capacitance connections, across the body wall, with both of its plates beneath the skin, or with one plate interior of the skin and the other exterior of the skin. A battery power source may be disposed within the body, and replaced periodically by surgery, or recharged inductively from the exterior of the body. Batteries capable of operation for periods in excess of one year are available, so that surgery for their replacement would need to be done either annually or at longer intervals.

While the self contained drive motor is herein shown and described in connection with the rotator of FIG. 9, it will be understood that it may be provided in conjunction with all of the other forms of rotators disclosed herein.

The descriptions concerning power supplies to the motor of FIG. 9 will, of course, relate also to power sources for motors connected to pump shafts external of the pump housings.

Figure 10:
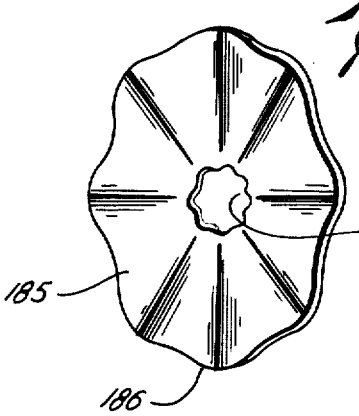

Referring now to FIG. 10 there is shown a rotator in the form of a plate 185, the peripheral edge 186 of which is of corrugated formation. The radial corrugations each extend narrowingly to the center opening 187 of the plate. The curved corrugation surfaces are adapted for acceleration of fluid circularly as the rotator is rotated, in either direction, about its center. This form of plate may be used alone as a rotator, or plurality as the flat plates of the second stage of the pump shown in FIG. 3. Similarly, the flat vane surfaces, such as in FIGS. 1 and 2, may be corrugated to enhance their accelerative purpose. Rotators of this form present only smooth surfaces to the blood or other fluid being pumped.

Figure 11:
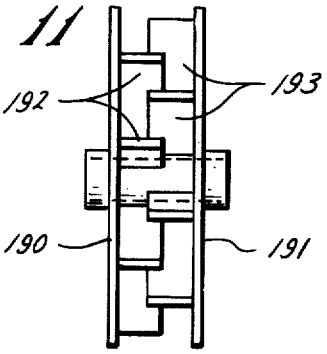

In FIG. 11, there is shown an accelerator or rotator having spaced parallel circular plates 190, 191 at the inner side of each of which are provided circularly spaced radial vanes 192 and 193. The vanes 192, 193 are staggered as shown, the vanes of each plate 190–191 being alternately disposed and extending only partway toward the opposite plate 190 or 191.

Figure 12:
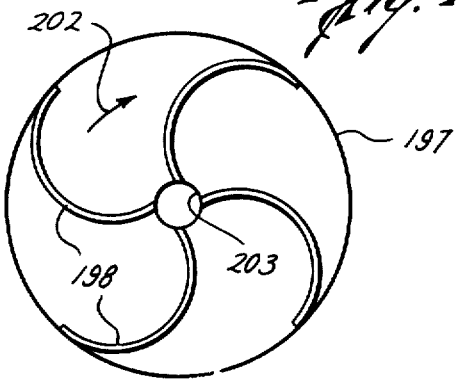

Referring now to FIG. 12 of the drawings, the rotator therein shown has a pair of opposite sides vanes or plates 197, only one being shown, between which are disposed a plurality of circularly spaced curved vanes 198. These vanes are of a shape, when rotated in the direction of arrow 202, serve to pick up blood from the entrance 203 to move it into the rotative path of the vanes, and then the concave curves of the vanes act to accelerate the fluid circularly while restraining somewhat outflow toward the periphery of the rotator, and at the same time lengthening the flow paths of the fluid from the center to the periphery of the rotator.

In each of the pumps shown in FIGS. 1–5, and pumps wherein use is made of rotators (or accelerators) of the different forms shown in FIGS. 6–12, it will be noted that the rotators are designed to avoid turbulence and to avoid rapid pressuring and depressuring of the blood or other fluid being pumped, and also to avoid any physical grinding or abrasive action upon the fluid. As has been made clear, these rotator designs are made in this manner in order that blood or other delicate liquids or gases being pumped, some containing solids in suspension, will not suffer detriment and will not be destroyed by the pumping operation.

In contrast to centrifugal pumps, the revolutions per minute of the rotators employed with the pumps herein shown and described are kept minimal. The several rotator designs presented are each of a form adapted to progressively increase the circular fluid velocities as the rotator turns and as the fluid advances toward the periphery of the rotator. In each pump presented, an annular fluid circulation space is provided, which is entirely unobstructed and regular so that fluid can circulate therein without turbulence or baffle effects.

As hereinbefore indicated, pumps may be made according to the invention incorporating features from one or more of the preferred embodiments shown and described herein, any particular feature not being confined to use only with the other features in connection with which it is herein shown and described.

The pumps and their parts may be constructed of any materials compatible with their intended use, including metals, mineral materials, plastics, rubbers, wood, or other suitable materials. When blood is to be pumped, consideration must be given to biological compatibility so that trauma to the blood will not result. Teflon has been successfully used in contact with blood, without traumatic effects, and may be used in construction of the pumps for blood pumping adaptations. Non-corrosive metals and alloys may be used in the pumps where required.

In the embodiment of FIG. 9, Teflon may be used for the membranes 179, 182 covering the windings of the electric motor structures.

The housings and rotators may be constructed of suitable material so that the housing may be rigid, semi-rigid, or elastic in whole or in part. The non-rigid constructions can be used for imparting pulse configurations to blood in heart simulation pumps.

While the rotators shown herein may in some cases perform better when rotated in one direction, it should be understood that they may be rotated in either direction, i.e. reversed, without other modification of the pumps. Each of the rotators presents surfaces to the fluid being pumped, to cause accelerating circular fluid motion in the pumping chamber. In some cases, the surfaces are parallel to the fluid flow; in other cases parallel and non-parallel surfaces are provided. Each of these surfaces, of whatever form, will accelerate the fluid regardless of the direction of rotation of the rotator. Each rotator should be rotated at a speed such that essentially no fluid turbulence occurs, and differences in the rotator designs affects the maximum speed at which a particular rotator may be rotated. The physical and flow properties of the fluid pumped will, of course, also affect the maximum speeds of rotation at which the rotators may be operated without turbulence and other objectionable effects, such as cavitation, vapor binding, and the like. It is, therefore, not possible to set forth exact rotational speed ranges for the rotators. But, the speeds of rotation will always be lower and will usually be substantially lower than those of centrifugal pumps and blowers, wherein turbulence always occurs at the impellers thrust the fluid radially outwardly against the periphery of the pumping chamber, and those of the aforementioned multiple disc pumps and compressors. To the end of achieving reduced rotator speeds, pumps provided according to this invention may be of larger size than other pumps, for the same pumping capacity. As internally placed heart pumps, the pumps may be as large as five inches in diameter, and, with removal of a lung, even larger.

According to the precepts of this invention, the forms of the rotators may vary considerably. For example, the rotators may be constructed entirely or partly of porous or perforate materials, i.e. the vanes of the rotator which accelerate the fluid circularly may be made of screen, of perforate plates or sheets, of spaced rods, or the like, and will still ably perform their fluid accelerating function. Rotators may be of axially extended form, so that the fluid is accelerated axially or axially and radially. Designs of this nature would extend the flow-path from inlet to outlet so that acceleration would be at a slower rate. In the rotator of FIG. 7, the vanes could be made to become closer together, instead of farther apart, toward the periphery of the rotator. In each of the pumps shown and/or described, one or more tangential outlets could be provided, disposed in the direction of fluid flow inside the peripheral wall of the pump. In multi-stage pumps, such as that shown in FIG. 3, the several rotators, which may be alike or unlike, may be driven at different rotational speeds. The axes of multi-stage rotators may be offset and in other positions out of alignment.

While preferred embodiments of apparatus according to the invention have been shown and described, many modifications thereof may be made by a person skilled in the art without departing from the spirit of the invention, and it is intended to protect by Letters Patent all forms of the invention falling within the scope of the following claims:

What is claimed is:

1. Pumping apparatus for use in pumping fluids susceptible to damage from turbulence and shock, comprising housing means having central fluid inlet means and peripheral fluid outlet means, rotator means disposed for rotation within said housing means and having surface means for accelerating fluid in substantially circular motion without said housing means as said fluid flows between said inlet means and said outlet means, means for sealing between said housing and rotator centrally about said inlet means and around the periphery of said rotator means, said inlet means including port means through said rotator means at the rotative axis thereof opening toward the periphery of said housing means, said surface means of said rotator means comprising plural parallel surfaces substantially each parallel to the planes of circular movement of said fluid passing through said housing means from said inlet means to said outlet means, said plural parallel surfaces being spaced at least one-fourth inch apart, said rotator means being adapted to rotate at a speed such that fluid passed thereto from said inlet means is caused to rotate circularly at substantially the speed of said rotator means, whereby turbulence and shock to said fluid in passing from said inlet means to said outlet means is avoided.

2. Pumping apparatus for use in pumping fluids susceptible to damage from turbulence and shock, comprising housing means having central fluid inlet means and peripheral fluid outlet means, rotator means disposed for rotation within said housing means and having surface means for accelerating fluid in substantially circular motion within said housing means as said fluid flows between said inlet means and said outlet means, means for sealing between said housing and rotator centrally about said inlet means and around the periphery of said rotator means, said inlet means including port means through said rotator means at the rotative axis thereof opening toward the periphery of said housing means, said surface means of said rotator means including at least one surface parallel to the planes of circular movement of said fluid passing through said housing means from said inlet means to said outlet means and at least one other surface angular to said one surface, said rotator means being adapted to rotate at a speed such that fluid passed thereto from said inlet means is caused to rotate circularly at substantially the speed of said rotator means, whereby turbulence and shock to said fluid in passing from said inlet means to said outlet means is avoided.

3. The combination of claim 2, each said other surface being curved between the center and periphery of said rotator means for elongating the paths of fluid flow therebetween.

4. The combination of claim 2, said surface means including at least one circular band shaped surface concentric with said rotator.

*5. Blood pumping apparatus, comprising:*

*a. housing means defining a chamber;*

*b. rotator means disposed for rotation within said chamber of said housing means and including at least two coaxial, spatially separated, smooth surfaced rotative vanes having axially spaced surfaces for accelerating blood introduced into the spatial separation between said vanes in a substantially circularly outward direction;*

*c. inlet means positioned within said housing means for introducing blood into the spatial separation between said rotative vanes generally along the rotative axis thereof;*

*d. outlet means positioned peripherally within said housing means for removing the outwardly accelerated blood;*

*e. means for rotating said rotative vanes at a speed such that the blood introduced into the spatial separation between said vanes is caused to rotate circularly at substantially the speed of said spatially separated vanes preventing turbulence and shock to the blood as the blood moves circularly outward between said inlet means and said outlet means; and*

*f. said rotative vanes being spaced apart a sufficient distance in relationship to the area of their surfaces in contact with the blood, said distance being on the order of one-fourth inch and greater, to minimize shear stresses imposed on the blood by frictional contact with the vane surfaces while maintaining a body of blood circulating within the chamber to provide a forced vortex radially increasing pressure gradient pumping action.*

*6. Pumping apparatus for use in pumping fluids susceptible to damage from turbulence and shock, comprising:*

*a. housing means defining a generally cylindrical chamber;*

*b. rotator means including at least two smooth surfaced circular accelerator vanes disposed for simultaneous rotation within said cylindrical chamber and positioned in a spatially separated relationship for accelerating fluid introduced into said spatial separation in an essentially circularly outward direction, at least one of said circular accelerator vanes defining a generally centrally positioned passageway therethrough, said surfaces being spaced at least one-fourth inch apart;*

*c. fluid inlet means positioned within said housing means for introducing fluid through said passageway in said accelerator vane into said spatial separation between said vanes generally along the rotative axis thereof;*

*d. fluid outlet means positioned peripherally within said housing means for removing the outwardly accelerated fluid from said cylindrical chamber; and*

*e. means for rotating said accelerator vanes at a speed such that the fluid introduced into said spatial separation between said vanes is caused to rotate circularly at substantially the speed of said vanes so as to prevent turbulence and shock to the fluid in passing circularly outward between said inlet means and said outlet means.*

* * * * *